United States Patent [19]
Kawata et al.

[11] Patent Number: 4,723,213
[45] Date of Patent: Feb. 2, 1988

[54] CONTROL DEVICE FOR VEHICLE SPEED

[75] Inventors: Shoji Kawata; Hitoshi Hyodo, both of Okazaki; Tokihiko Akita, Toyota, all of Japan

[73] Assignee: Aisin Seiki Kabushikikaisha, Aichi, Japan

[21] Appl. No.: 647,497

[22] Filed: Sep. 5, 1984

[30] Foreign Application Priority Data

Sep. 9, 1983 [JP] Japan .................. 58-165046

[51] Int. Cl.⁴ .............................................. B60K 31/00
[52] U.S. Cl. ..................... 364/426; 180/176; 180/179; 364/565
[58] Field of Search ........................ 364/426, 436, 565; 180/170, 175, 176, 178, 179; 123/320, 325

[56] References Cited

U.S. PATENT DOCUMENTS

| 4,056,157 | 11/1977 | Kawata | 180/105 E |
| 4,121,685 | 11/1978 | Mann | 180/108 |
| 4,138,723 | 2/1979 | Nehmer et al. | 364/424 |
| 4,218,997 | 8/1980 | Hunt | 123/352 |
| 4,352,403 | 10/1982 | Burney | 180/176 |
| 4,394,739 | 4/1983 | Suzuki et al. | 364/426 |
| 4,402,376 | 9/1983 | Hayashi et al. | 180/179 |
| 4,431,077 | 2/1984 | Burney | 180/176 |
| 4,484,279 | 11/1984 | Muto | 364/426 |
| 4,495,454 | 1/1985 | Collonia | 364/426 |
| 4,540,060 | 9/1985 | Kawata et al. | 180/179 |
| 4,549,266 | 11/1985 | Schneider et al. | 364/426 |
| 4,553,621 | 11/1985 | Hyodo et al. | 180/179 |
| 4,562,543 | 12/1985 | Zuber et al. | 364/426 |

FOREIGN PATENT DOCUMENTS 2654533  6/1978  Fed. Rep. of Germany ...... 364/426

Primary Examiner—Errol A. Krass
Assistant Examiner—Daniel W. Juffernbruch
Attorney, Agent, or Firm—Sughrue, Mion, Zinn, Macpeak & Seas

[57] ABSTRACT

In such an operation mode that the vehicle is accelerated upon turning-on of the switch and, when the vehicle has reached a given vehicle speed, the switch is turned off to memorize the vehicle speed at that time for effecting constant-speed control at the memorized vehicle speed, a throttle valve is returned to apply the engine brake after turning-off of the switch. If at least one of several given conditions is satisfied, adjustment of opening degree of the throttle valve is started so as to maintain the current vehicle speed at the goal vehicle speed. This makes smaller overshoot of the controlled vehicle speed caused by a response delay of the vehicle. The given condition may be related to differences between current speed and set speed, elapsed time, elapsed distance, or degree of acceleration.

8 Claims, 13 Drawing Figures

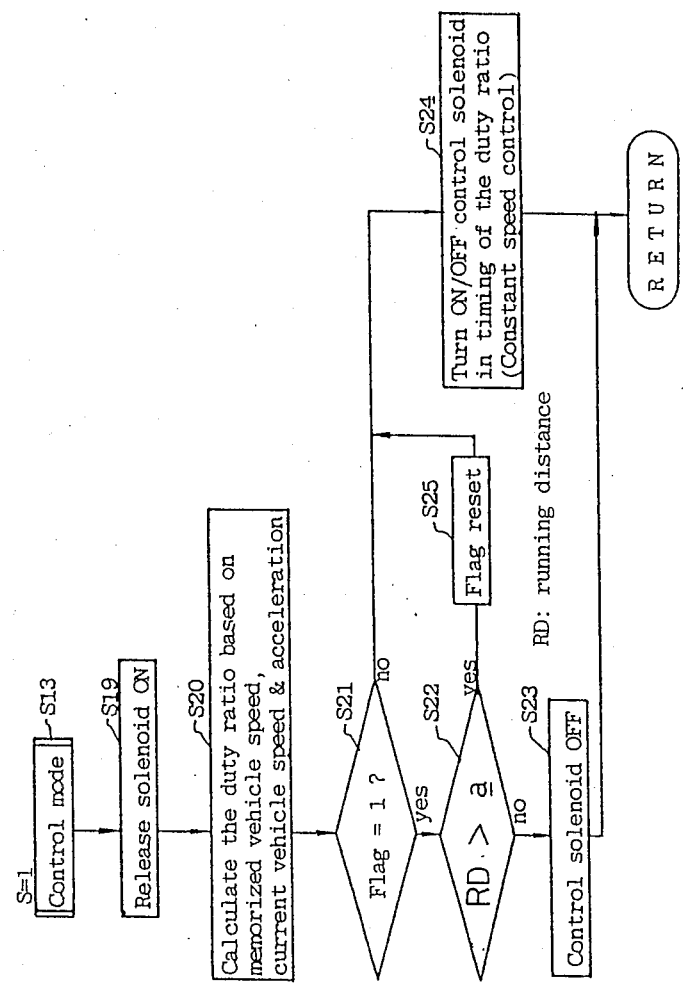

CONTROL DEVICE FOR VEHICLE SPEED

BACKGROUND OF THE INVENTION

The present invention relates to a control device for vehicle speed which is adapted to memorize the speed of a vehicle and automatically maintain the vehicle at the memorized vehicle speed, and more particularly to a control device for vehicle speed which has a function capable of memorizing the vehicle speed in a desired state while accelerating the vehicle in accordance with switch actuation.

The control device for vehicle speed of this kind generally comprises a throttle driving means operatively coupled to a throttle valve for driving the same, a vehicle speed detecting means for detecting the vehicle speed, a vehicle speed memorizing means for memorizing the vehicle speed, an electronic control means for comparing the memorized vehicle speed with the current vehicle speed to control the throttle driving means so that the difference therebetween becomes zero, and at least one command switch. The command switch includes a resume switch. In such control device, when the resume switch continues to be pressed over a certain time, it comes into an acceleration/memorization mode. More specifically, during the time the driver is pressing the resume switch, the vehicle is automatically accelerated, and when the switch is released, the vehicle speed at that time is memorized and control is made to keep the memorized vehicle speed as a target vehicle speed.

Meanwhile, a driving mechanism of the vehicle has been set in an acceleration mode up to the time immediately before the resume switch is released. Such a driving mechanism, i.e., engine system and control system, has a relatively large delay in its response because of a mechanical system included therein. This response delay is large particularly in the vehicle loaded with a turbocharger. Accordingly, when an electronic device for vehicle speed control is changed in its output from an acceleration mode to a target speed holding mode upon releasing of the resume switch, it takes a fairly long time for the vehicle to change from an acceleration mode to a target speed holding mode in practice. As shown in FIG. 1, hence, there causes an undesirable phenomenon that is called overshoot i.e., the vehicle speed is first increased beyond the memorized vehicle speed and then lowered down to the memorized vehicle speed for a certain time.

For this reason, there has been proposed a technique intended to reduce the apparent overshoot by memorizing the vehicle speed a little higher than that at the moment the resume switch is released, as shown in FIG. 2. But this technique is unsatisfactory because the vehicle comes into constant-speed traveling at a vehicle speed different from one that the driver desires. As an alternative, there has been proposed another technique intended to hold acceleration at a relatively small constant value during press of the switch. But with this technique, it takes a longer time for the vehicle to reach the desired vehicle speed.

SUMMARY OF THE INVENTION

It is an object of the present invention to quickly set the vehicle speed at a given one that the driver desires without causing large overshoot.

In such an operation mode that the target vehicle speed is to be maintained immediately after setting of the target vehicle speed, the opening degree of a throttle valve is set at a value corresponding to the target vehicle speed or at a little smaller value than the former. The amount of an engine brake force produced in such a state is relatively small. However, by moving the throttle valve in the closing direction thereof so as to produce the larger amount of an engine brake force, it becomes possible to return the engine from an acceleration mode to a constant-speed mode in a relatively short time.

In view of the above, according to the present invention, a throttle driving means is controlled to move the throttle valve in the closing direction thereof to apply the larger engine brake until the predetermined condition relating to the vehicle speed will be satisfied, when the control device is changed from an acceleration control mode to a constant-speed control mode.

The above predetermined condition may be given by any one of the following items or any combination of some among them, for example.

(a) Acceleration of the vehicle becomes zero or less than a certain negative value.

(b) After the vehicle speed has reached the peak value, the difference between the memorized vehicle speed and the actual vehicle speed becomes less than a certain value.

(c) The lapsed time after releasing of the switch, i.e., after it has come into a constant-speed control mode, exceeds a certain value.

(d) The running distance of the vehicle after releasing of the switch exceeds a certain value.

By so doing, when the device comes into a constant speed control mode after an acceleration control mode, the throttle valve is largely closed so that the large engine brake is applied during the time the vehicle speed undergoes overshoot, thus greatly restraining overshoot. As a result, it becomes possible to reduce a danger of collision with the preceding vehicle in case of using the device as mentioned above, the resulting fear as well as the uncomfortable feeling attendant on rise and fall of the vehicle speed.

Other objects and features of the present invention will be apparent from the following description of an embodiment with reference to the accompanying drawings.

BRIEF DESCRIPTION OF THE DRAWINGS

FIGS. 11, 12, and 13 are flow charts, similar to FIG. 7, further illustrating the operation of the microcomputer CPU in FIG. 3.

DESCRIPTION OF ONE PREFERRED EMBODIMENT

In the following one preferred embodiment of the present invention will be described with reference to the accompanying drawings.

Figure 3:
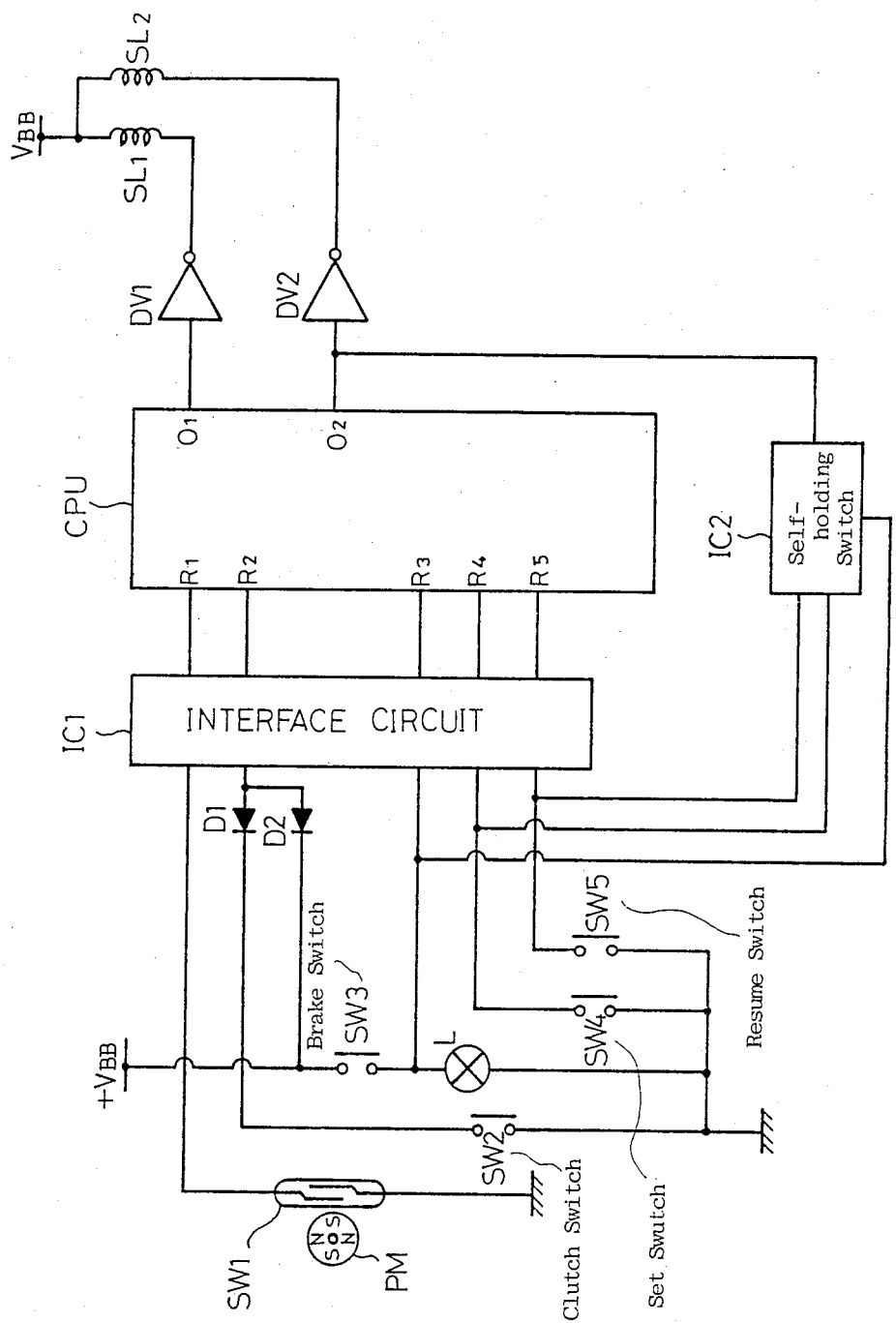
FIG. 3 is a block diagram showing the configuration of an electrical circuit according to one embodiment of the present invention.

FIG. 3 shows an electrical circuit of a constant speed traveling device. In the illustrated embodiment, this circuit mainly comprises a single chip microcomputer CPU. To input ports R1 to R5 of the microcomputer CPU there are applied through an interface circuit ICl outputs from a reed switch SW1 for detecting a vehicle speed signal, a clutch switch SW2 for detecting tread-on of a clutch pedal (not shown), a brake switch SW3 for detecting tread-on of a brake pedal (not shown), a set switch SW4 and a resume switch SW5, respectively.

A permanent magnet PM connected to a speed meter cable (not shown) is arranged in the vicinity of the reed switch SW1, and as the permanent magnet PM is rotated with traveling of a vehicle, the contact of the reed switch SW5 is opened and closed correspondingly, so that pulses of frequency in proportion to the vehicle speed (vehicle speed signal) are sent to the CPU.

The clutch switch SW2 is opened and closed in interlock relation with the clutch pedal of the vehicle, and the stop switch SW3 is opened and closed in interlock relation with the brake pedal of the vehicle. A stop lamp L is connected to the stop switch SW3, so that the stop lamp L is lit up with the switch SW3 being turned ON (closed).

The set switch SW4 and the resume switch SW5 are both press button switches and arranged on an instrument panel at positions convenient for the driver to operate them easily. Upon pressing of the set switch SW4, the vehicle speed is memorized and constant speed control is started. When either the clutch switch SW2 or the brake switch SW3 is pressed, constant speed traveling is inhibited but, at this time, the memorized vehicle speed is not erased. With the resume switch SW5 being pressed, constant speed traveling control is started at the memorized vehicle speed.

Driving circuits DV1 and DV2 are connected to output ports 01, 02 of the microcomputer CPU, respectively. To an output of the driving crcuit DV1 is connected control solenoid SL1 for controlling a later-described negative pressure actuator 100, while to an output of the driving circuit DV2 is connected a release solenoid SL2.

A self-holding circuit IC2 holds at its output an L level signal upon turning-on of the brake switch SW3, thereby to energize the release solenoid SL2 independently of operation of the CPU, and the circuit IC2 holds at its output an H level signal upon turning-on of both the set switch SW4 and the resume switch SW5, thereby to deenergize the release solenoid.

Figure 1:
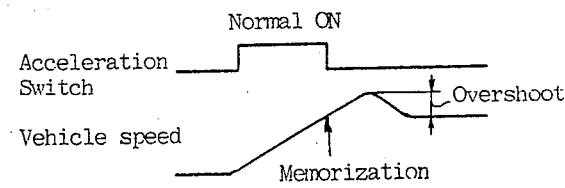
FIGS. 1 and 2 are timing charts showing the relationship between actuation of the switch and the vehicle speed in example of the prior art.
Figure 2:
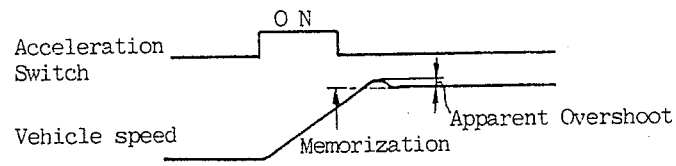
Figure 4:
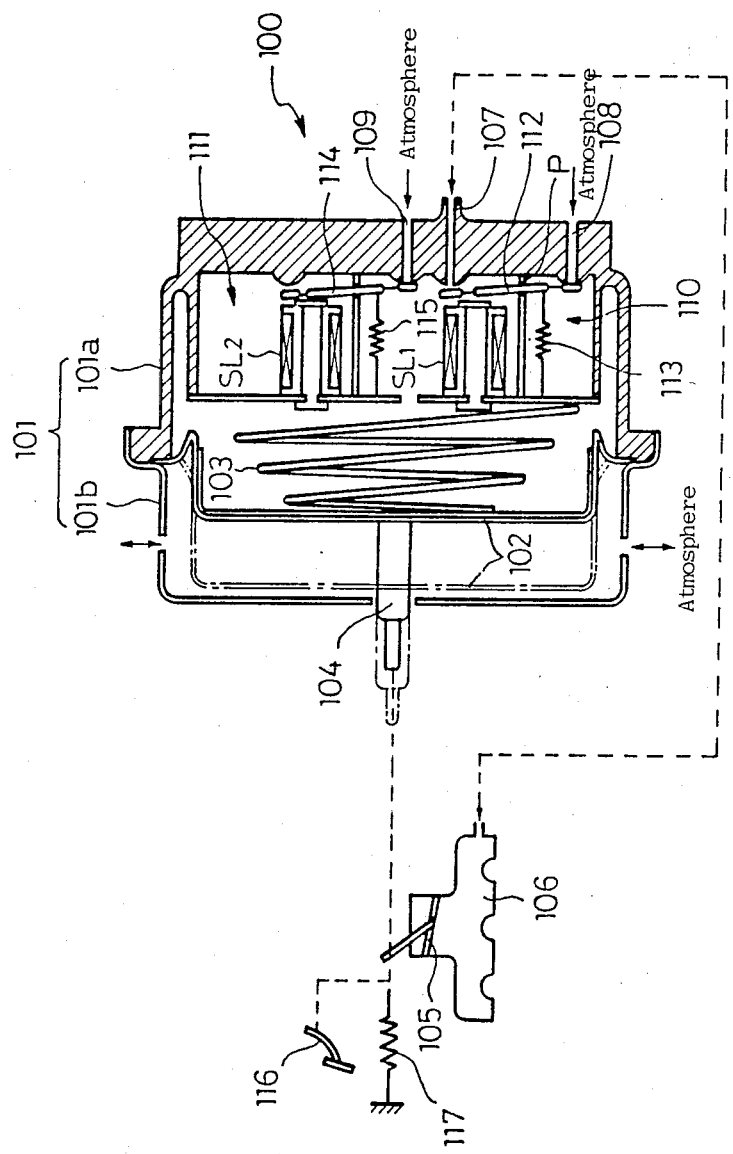
FIG. 4 is a longitudinal sectional view showing a throttle driving system of the device shown in FIG. 3.

FIG. 4 shows the construction of a negative pressure actuator 100 to be controlled by the electrical circuit of FIG. 1. Description will be made by referring to FIG. 4. A housing 101 is composed of two sections 101a and 101b. A diaphragm 102 is held between the flanged parts of these two sections 101a and 101b. A space defined by the diaphragm 102 and the housing section 101a serves as a negative pressure chamber, while a space defined by the diaphram 102 and the housing section 101b is in communication with the atmosphere. Designated at 103 is a compression coil spring interposed between the housing section 101a and the diaphragm 102, the spring pushing back the diaphragm 102 to a position indicated by phantom lines when the pressure within the negative pressure chamber is near the atmospheric pressure. A projection 104 fixed to the diaphragm 102 in a position near its center is operatively connected to a link of a throttle valve 105. This housing section 101a is provided with a negative pressure intake port 107 in communication with an intake manifold 106 and also atmosphere intake ports 108, 109.

Designated at 110 is a negative pressure control valve and at 111 is a negative pressure release valve, both valves being fixed to the housing section 101a. A movable piece 112 of the negative pressure control valve 110 is capable of tilting about a point P, and it has one end connected to an extension coil spring 113 and the other end facing the control solenoid SL1. Both ends of the movable piece 112 function as valve bodies, which are operated in accordance with energization/deenergization of the solenoid SL1 coming into either a state where the negative pressure intake port 107 is opened and the atmosphere intake port 108 is closed (i.e., the state illustrated) or a state where the negative pressure intake port 107 is closed and the atmosphere intake port 108 is opened.

The negative pressure release valve 111 includes a movable piece 114, an extension coil spring 115 and a solenoid SL2 similarly to the control valve 110, the movable piece 114 functioning to close the atmosphere intake port 109 (corresponding to the state illustrated) or open the same. Incidentally, designated at 116 is an accelerator pedal and at 117 is an extension coil spring.

During control of constant-speed traveling, the current vehicle speed is compared with the memorized vehicle speed in the CPU, and the duty ratio for controlling the control solenoid is determined so that the difference between those two vehicle speeds becomes zero. In need of deceleration, for example, the duty ratio is made smaller to increase a proportion of time in which the negative pressure control valve 110 causes the inside of the negative pressure actuator 100 to communicate with the atmosphere, so that the throttle valve is closed by the negative pressure actuator 100. To the contrary, in need of acceleration, the duty ratio is made larger causing the throttle valve to be opened by the actuator 100.

Hereinafter the program to be executed will be described with reference to FIGS. 5 to 9.

Figure 5:
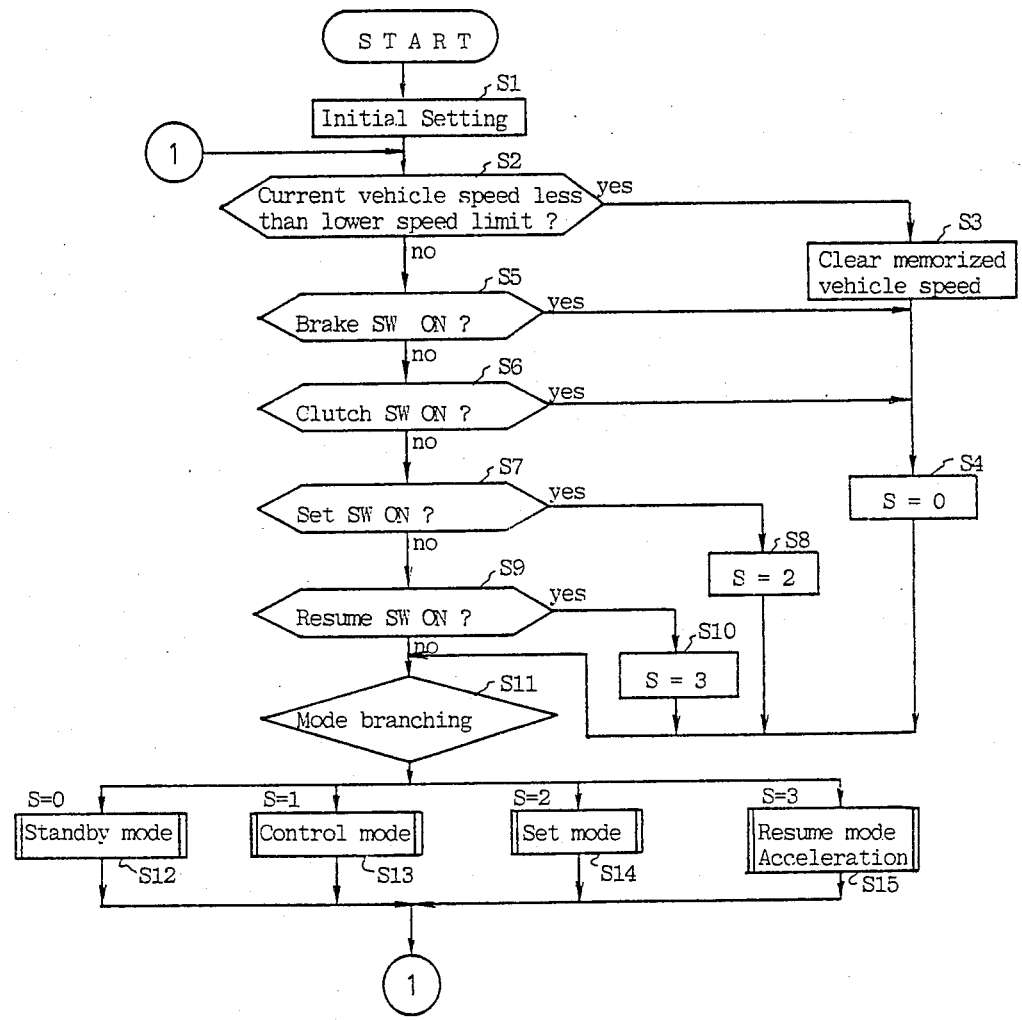
FIGS. 5, 6, 7, 8 and 9 are flow charts showing operation of a microcomputer CPU shown in FIG. 3.
Figure 6:
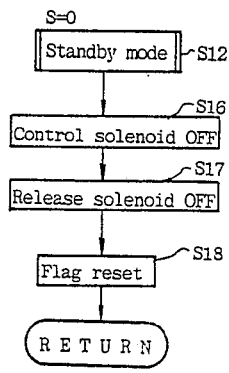

First referring to FIG. 5, when powered on to apply voltage to the CPU, initial setting is performed. More specifically, the output ports are set at an initial level and the content of a memory is cleared (S1). Next, it is judged in a step S2 whether or not the current vehicle speed is less than the lower speed limit (e.g., 40 km/h). If so, the memorized vehicle speed is cleared in a step S3 and a status flag S is set to be 0 in a step S4.

If the current vehicle speed is not less than the lower speed limit in the step S2, it is judged in a step S5 whether or not the brake switch SW3 is turned ON (closed) and it is then judged in a step S6 whether or not the clutch switch SW2 is turned ON. If either switch is turned ON, the status flag S is set to be 0 in the step S4 and, if both switches are not turned ON, it is judged in a step S7 whether or not the set switch SW4 is turned ON. In case of YES, that is, when the set switch SW4 is turned ON, the status flag S is set to be 2. If the resume switch SW5 is turned ON in a step S9, the status flag S is set to be 3 in a step S10.

The flow is branched to any one of four routines S12 to S15 in a step S11 in accordance with the values 0 to 3 of the status flag S.

In case of S=0, i.e., the standby mode routine S12 (FIG. 6), the control solenoid SL1 and the release solenoid SL2 are turned OFF in steps S16 and S17, respectively, to cancel throttle control, and the flag is then reset, namely, set to be 0 in a step S18. This is effected only after acceleration in order to confirm "duty ratio=0" for prevention of overshoot.

In case of S=1, i.e., the control mode routine S13 (FIG. 7), the release solenoid SL2 is first turned ON in a step S19, and the duty ratio is then calculated in a step S20 based on the memorized vehicle speed, the current vehicle speed and acceleration. Next, it is judged in a step S21 whether or not the flag=1, that is, acceleration has preceded. In case of NO, i.e., when acceleration has not preceded, the CPU comes into a step S24 where the control solenoid undergoes ON/OFF control in accordance with timing of the duty ratio so as to perform constant-speed control. If it is judged in the step S21 that the flag =1, namely, acceleration has preceded, it is then judged in a step S22 whether or not the given vehicle speed condition is satisfied, i.e., acceleration is negative (<0) in this embodiment. In case of NO, that is, when the acceleration mode is still continued, the control solenoid is turned OFF in a step S23 to close the throttle valve, whereby the engine brake is applied so as to restrain overshoot after acceleration control. When it is judged in the step S22 that the acceleration mode is not continued, the flag is reset in a step S25 and the control solenoid is then turned ON/OFF in the step S24 to perform constant-speed control.

In case of S=2, i.e., the set mode routine S14 (FIG. 8), the release solenoid is turned ON in a step S30 and it is then judged in a step S31 whether or not the set switch SW4 is turned ON. In case of NO, i.e., when the set switch is released to be OFF after being once turned ON, the current vehicle speed is stored in a memorized vehicle speed register within the CPU in a step S33, and the status flag S is then set at 1. This permits subsequent constant-speed control in the control mode loop. In case of YES in the step S31, i.e., when the set switch continues to be pressed, the vehicle speed is not memorized and the control solenoid SL1 is turned OFF in a step S32 for return.

In case of S=3, i.e., the resume mode routine S15 (FIG. 9), the release solenoid SL2 is turned ON in a step S35 and it is then judged in a step S36 whether or not the resume switch SW5 is turned ON (closed). In case of NO, i.e., when the resume switch is released to be OFF after being once turned ON, the status flag S is set at 1 in a step S37 so as to permit subsequent entry to the control mode routine. In case of YES in the step S36, i.e., when the resume switch SW5 still continues to be pressed, it is judged in S38 whether or not it has lapsed over 0.5 second after turning-on (closing) of the resume switch. In case of YES, i.e., when the resume switch SW5 continues to be pressed over 0.5 second, the control solenoid is turned ON to perform acceleration control in S39. The current vehicle speed is newly memorized in S40 and the flag is then set at 1 in S43. In case of NO, i.e., when the switch is released within 0.5 second, for example, after being previously pressed, the goal vehicle speed is set as the memorized vehicle speed in S41, and the control solenoid then undergoes ON/OFF control in S42 so as to the vehicle at the goal vehicle speed.

Figure 7:
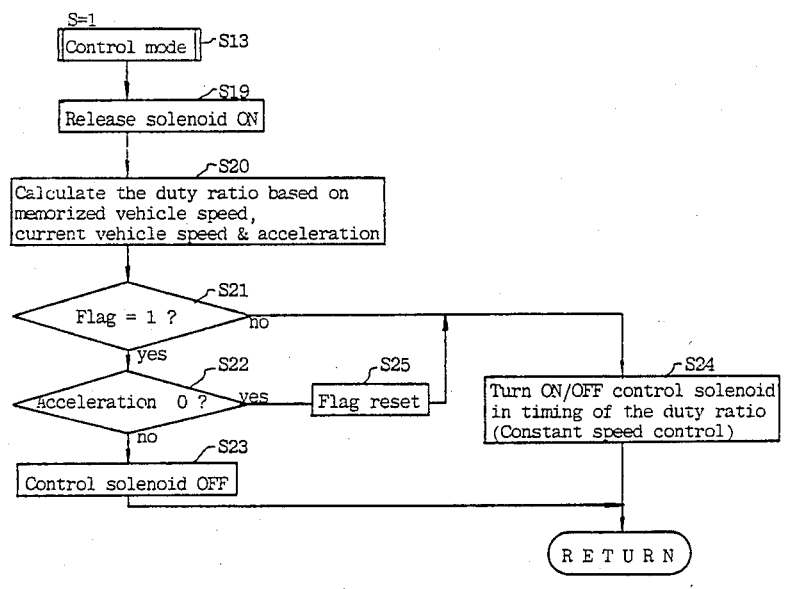
Figure 8:
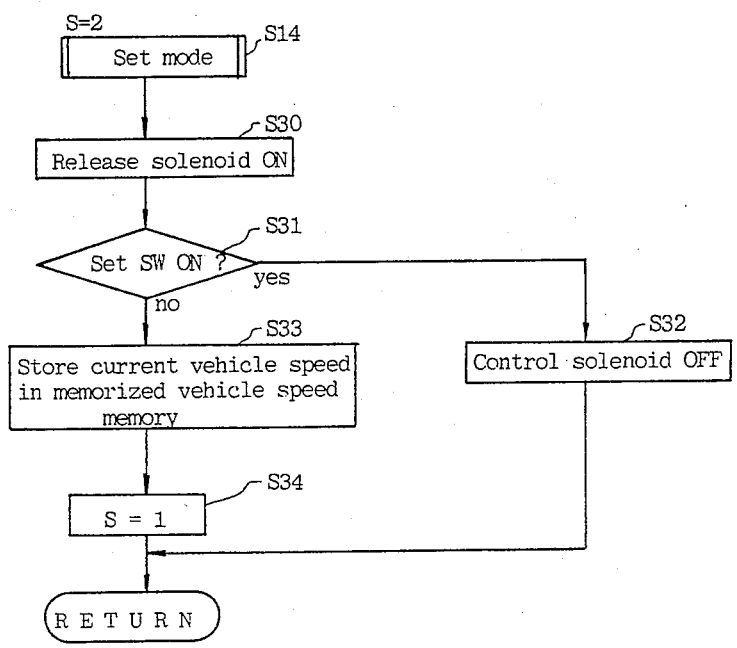
Figure 9:
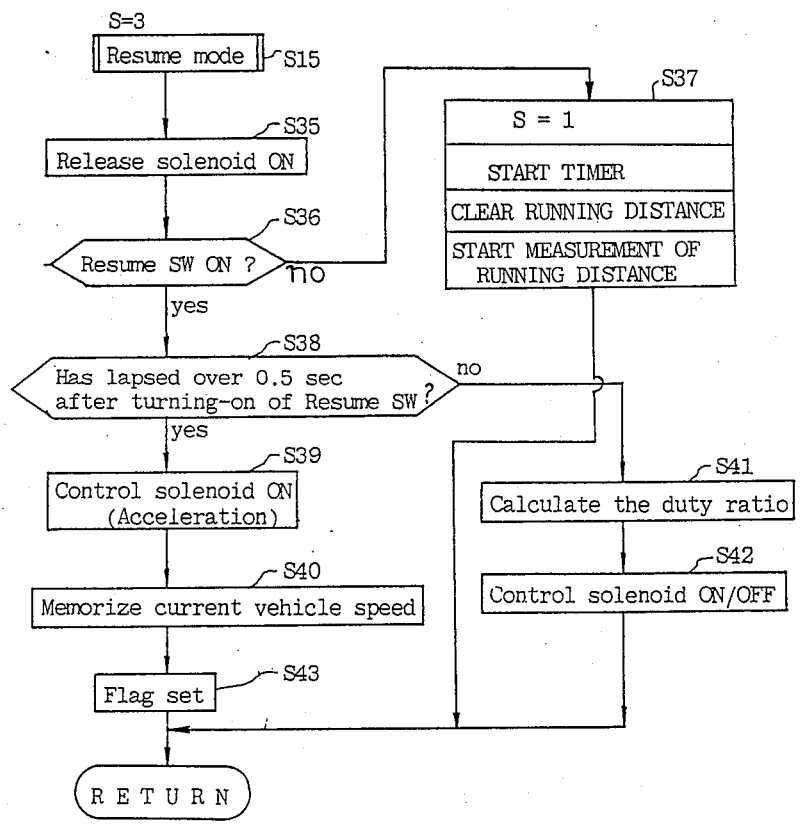
Figure 10:
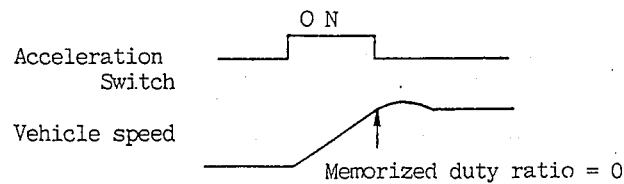
FIG. 10 is a timing chart showing the relationship between actuation of the switch and the vehicle speed obtained by the device shown in FIG. 3.

The above mentioned program is executed in the CPU and any desired one of various modes is achieved in response to actuation of the brake switch, clutch switch, set switch and the resume switch. In particular, after the resume switch SW5 has continued to be pressed for acceleration, the throttle valve is closed to apply the engine brake until the associated given speed condition is satisfied, whereby the device is able to come into constant-speed control with smaller overshoot, as shown in FIG. 10. Although in the foregoing embodiment the vehicle speed condition of the step S22 in FIG. 7 is given by "acceleration <0", the condition may be replaced by any one of other such conditions or any combination of some among them as follows; acceleration $< -a$ (where a is a positive constant), speed deviation (memorized vehicle speed−current vehicle speed) after peak of the rising vehicle speed $<a$, lapsed time after turning-off of the acceleration switch $>a$, or running distance after turning-off of the acceleration switch $>a$.

Figure 11:
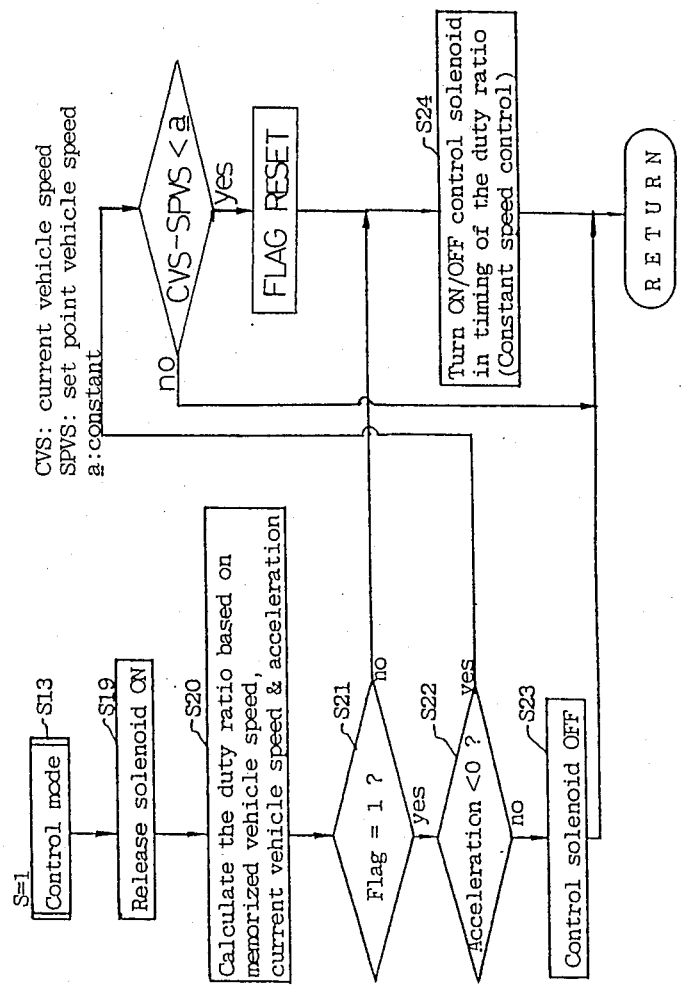
Figure 12:
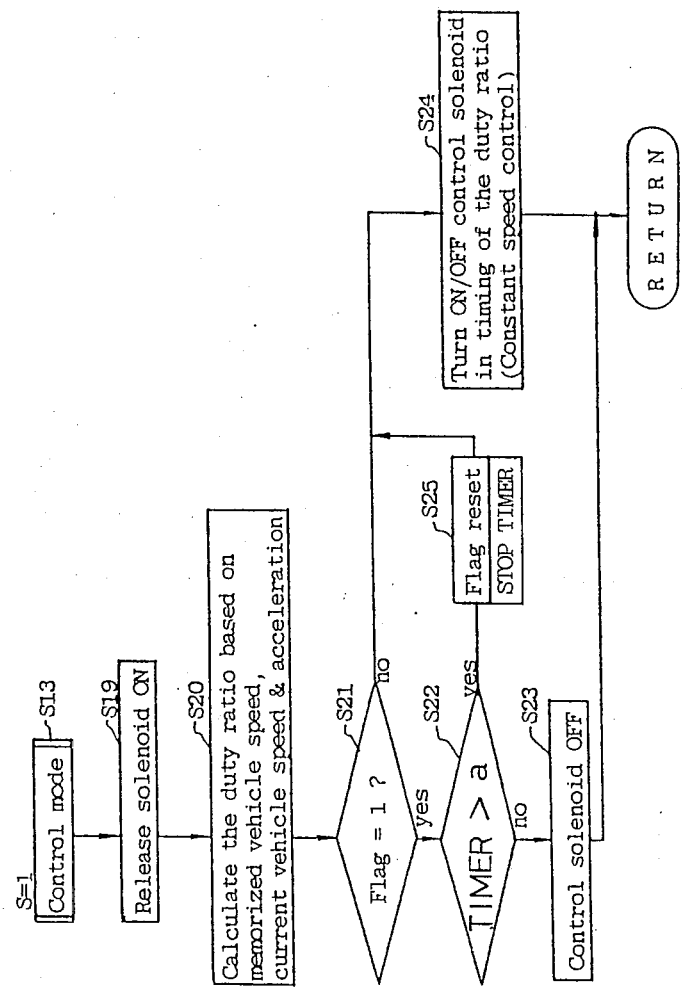

FIG. 11 shows the control mode routine S13 when the condition being monitored is whether the difference between the current vehicle speed CVS and the set point (predetermined) vehicle speed SPVS is less than a constant (a). Likewise, FIG. 12 shows the control mode routine S13 when the condition being monitored is whether the lapsed time after the turning off of the acceleration switch is longer than a constant (a). Finally, as yet another alternative, FIG. 13 shows the control mode routine S13 when the given condition being monitored is whether the running distance after the turning off of the acceleration switch is greater than a constant (a). Of course, the microcomputer CPU monitors all of these functions, and the control mode routine operates based on the satisfaction of at least on of the above-described given conditions.

What is claimed is:

1. A control device for vehicle speed comprising:
   a throttle driving means operatively coupled to a throttle valve of a vehicle;
   a switch means for increasing current vehicle speed;
   a vehicle speed detecting means for generating a signal in accordance with the current vehicle speed;
   a vehicle speed memory for storing a predetermined vehicle speed; and
   an electronic control means which firstly controls said throttle driving means to raise up the current vehicle speed in response to a first actuation of said switch means for increasing current vehicle speed, which secondly memorizes in said vehicle speed memory the current vehicle speed as the predetermined vehicle speed in accordance with an output signal issued from said vehicle speed detecting means at that time in response to a second actuation of said switch means for increasing current vehicle speed, which thirdly controls said throttle driving means to bring said throttle valve temporarily into a closed state during a period from said memorization until satisfaction of at least one of a plurality of given conditions so as to control an amount of overshoot which occurs after said second actuation of said switch means, when said current vehicle speed is stored as said predetermined vehicle speed, said overshoot amoutn cooresponding to a variance from said predetermined vehicle speed, and which fourthly controls said throttle driving means in accordance with said predetermined vehicle speed and the current vehicle speed at that time, when said at least one of said plurality of given conditions is satisfied and the amount of overshoot thus has been compensated, thereby to control the current vehicle speed at the predetermined vehicle speed.

2. A control device for vehicle speed according to claim 1, wherein said plurality of given conditions include the following:
acceleration of the vehicle being less than a predetermined value;
the difference between the current vehicle speed and the predetermined vehicle speed being ess than a predetermined value after the vehicle speed has reached its peak because if continued acceleration after said second actuation of said switch means;
the lapsed tim from the second actuation of said switch means for increasing current vehicle speed being larger than a predetermined value; and
the running distance of the vehicle from the seocnd actuation of said switch means for increasing current vehicle speed being larger than a predetermined value.

3. A control device for vehicle speed according to claim 1, wherein the first actuation of said switch means for increasing current vehicle speed is such that said switch means is held in its ON state continuously over a predetermined time, and the second actuation of said switch means for increasing current vehicle speed returns said switch means to its OFF state after said first actuation.

4. A control device for vehicle speed according to claim 3, wherein said electronic control means controls said throttle driving means in accordance with the content of said vehicle speed memory and the current vehicle speed without waiting for said at least one of a plurality of given conditions to be satisfied, when said switch means for increasing current vehicle speed is held in its ON state in a shorter period than said predetermined time.

5. A control device for vehicle speed according to claim 1, wherein said throttle driving means comprises a housing, a diaphragm for partitioning the inner space of said housing, a connecting rod attached to said diaphragm, a spring for exerting a force in a first direction on said diaphragm, a presence applying port formed in said housing, and an electromagnetic actuator for opening and closing said pressure applying port to adjust the pressure in at least one of the partitioned inner spaces of said housing.

6. A control device for vehicle speed according to claim 5, wherein said electromagnetic actuator is formed of a channel selector valve for introducing either atmospheric pressure or negative pressure into the inner space of said housing when energized or deenergized, and said electronical control means controls the duty ratio of energization to deenergization of said electromagnetic actuator to adjust the opening degree of said throttle valve.

7. A control device for vehicle speed comprising:

a throttle driving means operatively coupled to a throttle valve of a vehicle;
a switch means for increasing current vehicle speed;
a vehicle speed detecting means for generating a signal in accordance with the current vehicle speed;
a vehicle speed memory for storing a predetermined vehicle speed; and
an electronic control means which firstly controls said throttle driving means to raise the vehicle speed in response to a first actuation of said switch means for increasing current vehicle speed, which secondly memorizes in said vehicle speed memory the current vehicle speed as the predetermined vehicle speed in accordance with an output signal issued from said vehicle speed detecting means at that time in response to a second actuation of said switch means for increasing current vehicle speed, which thirdly controls said throttle driving means to bring said throttle valve into a closed state during a period from said memorization until satisfaction of at least one of a plurality of conditions so as to control an amount of overshoot which occurs after said second actuation of said switch means, when said current vehicle speed is stored as said predetermined vehicle speed, said overshoot amount corresponding to a variance from said predetermined vehicle speed, said plurality of conditions including the following:
acceleration of the vehicle being less than a predetermined value;
the difference between the current vehicle speed and the memorized vehicle speed being less than a predetermined value after the vehicle speed has reached its peak because of continued acceleration after said second actuation of said switch means;
the lapsed time from the second actuation of said switch means for increasing current vehicle speed being larger than a predetermined value; and
the running distance of the vehicle from the second actuation of said switch means for increasing current vehicle speed being larger than a predetermined value,
and which fourthly controls said throttle driving means in accordance with said predetermined vehicle speed memorized in said vehicle speed memory and the current vehicle speed at that time, when said at least one of the plurality of conditions is satisfied and the amount of overshoot thus has been compensated, thereby to control the current vehicle speed at the predetermined vehicle speed.

8. A control device for vehicle speed according to claim 7, wherein said throttle driving means comprises a housing, a diaphragm for partitioning the inner space of said housing, a connecting rod attached to said diaphragm, a spring for exerting a force in a first direction on said diaphragm, a pressure applying port formed in said housing, and an electromagnetic actuator for opening and closing said pressure applying port to adjust the pressure in at least one of the partitioned inner spaces of said housing.

* * * * *